Patented Aug. 26, 1941

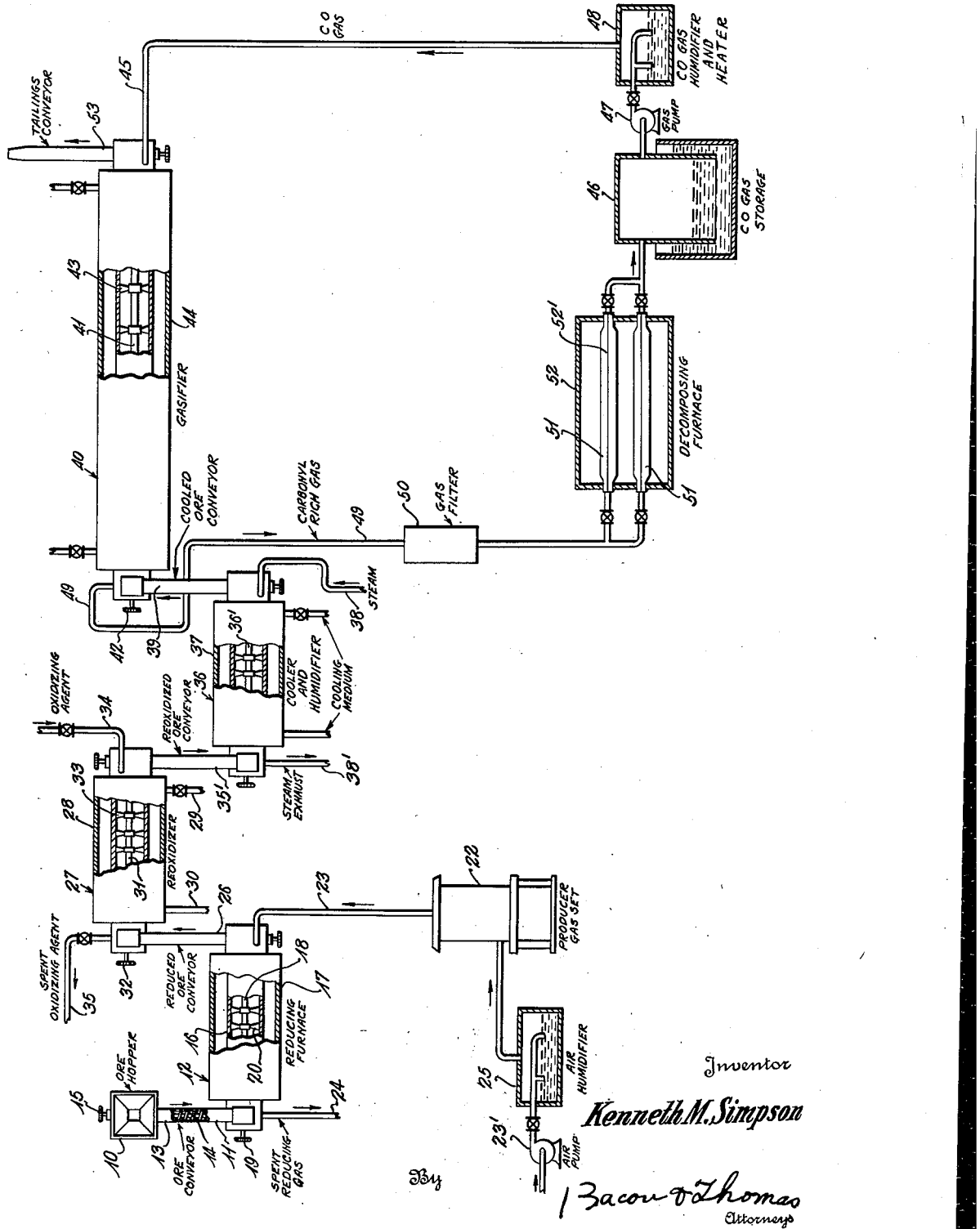

2,254,158

UNITED STATES PATENT OFFICE 2,254,158

PROCESS OF RECOVERING NICKEL

Kenneth M. Simpson, New York, N. Y.

Application October 8, 1940, Serial No. 360,326

22 Claims. (Cl. 75—82)

This invention relates to a process of recovering nickel from its ores, and more particularly to a process wherein substantially pure nickel carbonyl is formed by treating ores containing nickel with carbon monoxide and the nickel carbonyl thereafter decomposed to deposit substantially pure nickel. The invention finds particular utility in recovering substantially pure nickel from ores containing iron as well as nickel.

An object of the present invention is to provide a process of recovering substantially pure nickel from ores containing the same in which the rate of nickel carbonyl formation is accelerated and the amount of nickel recovered is increased.

Another object of the invention is to provide a process of recovering nickel from ores containing nickel and iron in which the iron component of the ore is rendered substantially inert to reaction with carbon monoxide, while the nickel component is conditioned to react with the carbon monoxide to form nickel carbonyl, which may thereafter be decomposed to form substantially pure nickel.

Another object is to provide a process in which a nickel containing ore is reduced and then selectively reoxidized to oxidize materials in the ore other than nickel in order to condition the ore for separating substantially pure nickel therefrom in a carbonyling step.

Another object is to provide a process in which an ore containing nickel and iron is reduced and then subjected to treatment with an oxidizing agent to selectively reoxidize the iron in order to condition the ore for the separation of nickel as nickel carbonyl and inhibit the formation of iron carbonyl.

Another object of the invention is to provide a process of recovering nickel from ores containing the same in which moisture is employed to condition the ore to facilitate the reaction of nickel with carbon monoxide to form nickel carbonyl while inhibiting reaction of carbon monoxide with other materials in the ore.

Another object of the invention is to provide a process of recovering substantially pure nickel from ores containing nickel and iron in which moisture is employed in the process to render and maintain the iron inert to reaction with carbon monoxide while the nickel is conditioned for reaction with carbon monoxide to form nickel carbonyl.

Another object is to provide a process in which a reduced ore containing nickel and iron is treated with carbon dioxide to selectively reoxidize the iron in order to condition the ore for separation of nickel as nickel carbonyl from the ore and inhibit the formation of iron carbonyl.

Another object of the invention is to provide a process of recovering nickel from ores containing the same, in which the ore is reduced to convert nickel into metallic form and the ore then cooled in the presence of moisture to condition the nickel for the formation of nickel carbonyl.

A further object of the invention is to provide a process of recovering nickel from ores containing nickel and iron, in which the ore is reduced and then cooled in the presence of sufficient moisture to condition the nickel for the formation of nickel carbonyl, while rendering the iron substantially inert to the reaction of carbon monoxide.

A still further object of the invention is to provide a process for recovering nickel from ores containing the same in which nickel carbonyl is formed by treating a reduced ore with carbon monoxide in the presence of moisture.

Other objects and advantages of the invention will appear in the following description of the invention. The process may be carried out in various forms of apparatus, but for convenience in describing one embodiment of the invention, reference is made to the accompanying drawing, which is a schematic diagram of an apparatus capable of carrying out a continuous process in accordance with the present invention.

Referring more particularly to the drawing, ore from the hopper 10 may be delivered by means of a closed screw conveyor 11 into a reducing furnace 12. The screw conveyor 11 may include a closed casing 13 having a screw conveyor member 14 positioned therein and driven from any suitable source of power through a sprocket or gear 15. The conveyor 11 is of the type which will form a seal between the hopper 10 and the reducing furnace 12 so as to prevent entrance of air into the reducing furnace and is also preferably of the type which will elevate the ore from the hopper 10 to the reducing furnace 12. The reducing furnace 12 may include a reducing chamber 16 positioned within a furnace housing 17 or the ore may be preheated and reduced with heated reduction gases. The reducing chamber 16 may be of elongated cylindrical form with its axis substantially horizontal, and may be provided with a stirring member including a shaft 18 driven from any suitable source of power through a sprocket or gear 19. The shaft 18 may be provided with a plurality of stirring arms 20 which stir the ore in the reducing chamber and gradually advance the ore toward the discharge end thereof. The furnace housing 17 may be supplied with heated products of combustion or other heating medium from any suitable source in order to raise the temperature of the ore to a desired reducing temperature.

Any suitable type of reducing gas may be employed in the reducing chamber 16. Producer gas which is rich in hydrogen and carbon monoxide is an example of a suitable reducing gas and may be formed in the gas producer 22 and introduced into the reducing chamber 16 through a pipe 23 for countercurrent operation. In such case, spent reducing gas may be exhausted from the reducing chamber through a pipe 24, although the gas flow may be reversed for concurrent operation. Moisture may be supplied to the producer 22 by passing the air, furnished to the gas producer 22 by an air pump 23', through a humidifier 25 before introducing the same into the producer 22. In order to control the moisture condition in the reduction chamber, additional moisture may be added in controlled amounts directly to the gas entering the reduction chamber.

The ore is preferably given a relatively drastic reducing treatment in the reducing chamber 16 so as to reduce substantially all of the nickel contained therein. The reduced ore may be continuously discharged from the reducing chamber 16 into a reduced ore conveyor 26 which may be of the same type as the conveyor 11. The conveyor 26 elevates the ore from the reducing chamber 16 and deposits the same in ore reoxidizing chamber 27 while sealing the reducing chamber from the reoxidizing chamber.

The reoxidizing chamber 27 is preferably provided with a heating or cooling jacket 28 through which any desired heating or cooling medium may be circulated by the pipes 29 and 30. The reoxidizing chamber 27 may be similar to the reducing chamber 16 and may be provided with a shaft 31 driven from any suitable source of power through a sprocket or gear 32. The shaft may likewise be provided with stirring arms 33 for stirring and advancing the ore under treatment in chamber 27. Provision is made for introducing a mild or selective reoxidizing agent into the reoxidizing chamber 27 through a pipe 34 and exhausting the same through a pipe 35. By properly controlling the amount of reoxidizing agent fed to the reoxidizing chamber 27 and the amount and temperature of the cooling or heating medium circulated through the jacket 28, ore can be selectively reoxidized at a desired temperature and continuously discharged into the conveyor 35'. The conveyor 35' may be similar to the conveyor 11 and serves to deposit the ore in a cooling and humidifying chamber 36 while sealing the reoxidizing chamber 27 from the cooling and humidifying chamber 36.

The cooling and humidifying chamber 36 may be similar to the reoxidizing chamber 27 and be provided with an agitating and ore advancing shaft 36' driven from any suitable source of power. It may also be provided with a cooling jacket 37 through which any desired cooling medium may be circulated. Provision may also be made to pass steam in direct contact with the ore by pipes 38 and 38' in order to add moisture to the ore. By regulating the amount and temperature of the cooling medium and steam the ore can be brought to any desired temperature and moisture content. The ore may be discharged into a conveyor 39 which conducts the same to a gasifying chamber 40 while sealing the cooling and humidifying chamber 36 from the gasifying chamber.

The gasifying chamber 40 may be similar to the reducing chamber 16 and the reoxidizing chamber 27, but will ordinarily be of greater capacity. It may likewise be provided with a shaft 41 rotated from any suitable source of power through a sprocket or gear 42. The shaft may also have stirring arms 43 for stirring and advancing the ore in the gasifying chamber 40. The gasifying chamber is preferably provided with a constant temperature jacket 44 containing a heat exchange medium such as water maintained at a constant temperature by any suitable means so as to maintain a substantially constant temperature in the gasifying chamber. Carbon monoxide-rich gas may be introduced into the gasifying chamber 40 through a pipe 45 so as to contact the ore therein and form nickel carbonyl. This gas may be withdrawn from a storage tank 46 by means of a pump 47 and passed through a gas humidifier and heater 48 before being introduced into the gasifying chamber 40. By maintaining a body of water in the gas humidifier at a predetermined temperature and passing the gas through this body of water, the gas entering the gasifying chamber 40 may be maintained at any desired degree of humidity so as to maintain the ore in the gasifying chamber 40 at a predetermined substantially constant moisture content.

Nickel carbonyl-rich gas may be withdrawn from the gasifier chamber 40 through a pipe 49 and is preferably passed through a gas filter 50. This gas filter may be of any type capable of preventing solid particles from passing therethrough, for example, a chamber containing glass wool or other fibrous material or porous plates. The carbonyl-rich gas from the gas filter may be delivered into any suitable type of decomposing chamber. By way of illustration, decomposing chambers such as shown at 51 may comprise elongated and flattened tubular members of cast iron or other metal positioned in a furnace or oven, 52. These tubular members may be divided longitudinally as at 52' so as to be capable of being opened in order to permit the removal of nickel deposited therein. The decomposing chambers may also be made of ceramic material or even heat resistant glass. The nickel adheres only superficially to the inner surfaces of such decomposing chambers and may be readily stripped therefrom. Any other type of decomposing chamber or furnace may be employed including those already known to the art. The decomposition of the nickel carbonyl liberates carbon monoxide which may be delivered to the storage tank 46 and reused in the process.

The ore from which nickel has been removed is delivered into the conveyor 53 from the gasifier chamber 40 and discharged from the process. The conveyor 53 may be similar to conveyor 11 and serves to remove the ore while sealing the gasifier chamber from the atmosphere. The ore introduced into the process is preferably finely divided in order that the treatment in the process may be uniform. Thus ores ground to approximately 200 mesh can be satisfactorily treated, although ores somewhat finer or coarser may be successfully employed. If desired, the ore may be brought to a predetermined moisture content, for example to a moisture content between 3 and 5% moisture, before it is introduced into the process, in order to be able to more uniformly control moisture conditions during the reduction of the ore particularly in concurrent reducing operations, although substantially dry ores or ores which vary in moisture content can be employed by suitably controlling the moisture content of the reducing gas.

Reduction of the ores should be carried out under conditions which reduce substantially all of the nickel contained in the ore, and sufficient reducing gas and time of treatment should be employed to accomplish this result. This will ordinarily result in the reduction of substantial quantities of iron if present in the ore. The time and temperature necessary for proper reduction will vary with different ores and different reducing gases but temperatures between approximately 950° and 1150° F. and preferably between approximately 1000° and 1025° F. are ordinarily suitable, although temperatures as high as 1400° F. may be necessary depending upon the nature of the ore and of the reducing gases. At these temperatures and with efficient contact between the ore and reducing gas, a reduction time of approximately 1 hour and 15 minutes will ordinarily insure that substantially all of the nickel is reduced, although in some cases substantially longer periods may be required.

After reduction, the ore is reoxidized in the reoxidizing chamber 27. When steam is employed as the reoxidizing agent the ore should be allowed to cool to approximately 850 to 950° F. and preferably to 875° to 900° F. before steam is brought into contact therewith. By properly controlling radiation of heat from the conveyor 26 a suitable temperature may be maintained on the ore entering the reoxidizing chamber. Steam treatment of the ore within this temperature range for a period ranging from 7 to 15 minutes will, in most cases, substantially completely reoxidize the iron without reoxidizing substantial amounts of nickel.

The ore is then cooled to a temperature of approximately 95 to 125° F. preferably in an atmosphere containing steam or water vapor and preferably under conditions to produce a substantial moisture content in the ore. This moisture content preferably ranges from 15% to 30% although the exact cooling and humidifying procedure will vary with different ores and in most cases a lower moisture content than that specifically given, for example, 3 to 5% is sufficient to produce advantageous results. Although the presence of moisture in the ore delivered to the gasifying chamber has certain advantages and moist ore appears to inhibit low temperature reduction and subsequent carbonyling of iron in the gasifying step, a properly selectively reoxidized ore enables substantially pure nickel to be recovered even if carbonyling is carried on in the absence of moisture.

The ore is continuously stirred in the gasifier chamber 40 and sufficient carbon monoxide-rich gas passed therethrough to always maintain a substantial excess of carbon monoxide. The temperature is preferably maintained at the temperature above given for the ore entering the gasifier chamber, that is, between approximately 95° and 125° F. and preferably approximately 105° to 115° F. The time necessary for the gasifying operation will depend on the nature of the ore and the extent to which it is desired to carry the separation of nickel from the ore and will usually be several hours.

The preferred temperature in the decomposing furnace ranges from approximately 380 to 400° F., but this temperature may vary between approximately 380 and 520° F. Sufficient capacity should be provided in the decomposing chamber 51 to insure that all of the gas comes in contact with the walls thereof and reaches the decomposing temperature of nickel carbonyl. Too low temperatures will allow undecomposed carbonyl to be carried through the decomposing chambers and too high temperatures result in the gas reaching the decomposing temperature before contacting the sides thereof, so that powdered nickel is deposited rather than a solid layer of nickel, although high temperatures may be employed if it is desired to produce finely divided nickel.

While a continuous process as above described is preferred, it is possible to carry out the process of the present invention in other apparatus, and even carry on all of the steps of the process in a single retort. For example, by providing a single retort with stirring mechanism, suitable heating and cooling means and proper gas connections, the ore may be heated and reduced in the retort at a suitable temperature, for example, between 975 and 980° F. with a reducing gas preferably containing moisture. The heating may then be discontinued and wet steam introduced into the retort and the ore therein cooled to below 700° F. and preferably to about 600° F., in seven or eight minutes both by the steam and by external cooling of the retort by water or other cooling medium. The ore may then be further cooled by indirect heat exchange to a temperature at least as low as 125° F. and preferably to approximately 105° F. so as to contain between 5 and 30% moisture and preferably between 15 and 25% moisture. Carbon monoxide-rich gas containing sufficient moisture to maintain the moisture content of the ore substantially constant may then be passed through the retort and the carbonyl-rich gas delivered to decomposing chambers wherein it is heated to temperatures between 380 and 520° F. and preferably between 380 and 400° F.

The process has been carried out in such a batch operation by employing a movable retort which was first positioned in a heating furnace and the retort rotated to stir the ores while producer gas was passed therethrough. The retort containing the ore was then removed from the furnace and cooled by passing steam through the retort and applying cold water to the external surface thereof, while rotating the retort. The retort was then placed in a constant temperature jacket and substantially pure carbon monoxide passed therethrough while the retort was rotated. The carbonyl-rich gas from the retort was delivered to a decomposer having heat resistant glass tubes positioned in a furnace housing.

The invention is particularly adaptable to ores containing nickel and iron in oxide or hydrated oxide form. An example of such an ore, of which extremely large quantities are available on the surface in relatively finely divided form, are Cuban ores which contain from 0.5% to 2.5% nickel and from 45% to 52% iron, the remainder being aluminum, silicon and small amounts of chromium and magnesium, all occurring primarily as oxides. The invention is, however, not limited to the particular ore referred to, as other ores of a similar nature are available in large quantities either in oxide form or in forms capable of being converted to oxides for introduction into the process of the present invention. Thus, ores containing nickel as a silicate mineral such as garnerite or genthite, the component oxides of which can be liberated by controlled ignition prior to reduction can be treated. Also sulphide ores containing nickel can be roasted to oxide form before reduction.

As a specific example of a process of the present invention, a Cuban ore of the type above referred to containing 1.24% nickel and ground to a fineness of approximately 200 mesh was heated in an externally heated closed retort to 975° F. The ore was reduced by passing producer gas through the chamber for one hour while the ore was agitated and maintained at a temperature between 975 and 980° F. The producer gas entered the retort at approximately 152° F. and was of the following composition:

| | Per cent |
|---|---|
| Carbon dioxide | 4.2 |
| Oxygen | 1.1 |
| Carbon monoxide | 25.9 |
| Hydrogen | 9.3 |
| Methane | 2.0 |
| Nitrogen (by difference) | 57.5 |

The producer gas contained 7.49 grains of water per cubic foot of gas at a temperature of 68° F.

Heating of the retort was discontinued and the ore cooled by the introduction of wet steam into the retort and external cooling of the retort with water. At the beginning of the cooling operation a steam pressure of 30 lbs. per square inch was applied to the retort. The following table shows the rate of cooling following the application of steam:

| Elapsed time, minutes | Temps. of ore, ° F. | Rate of cooling ° F. per minute |
|---|---|---|
| 0 | 965 | |
| 1 | 960 | 5 |
| 2 | 945 | 15 |
| 3 | 900 | 45 |
| 4 | 860 | 40 |
| 5 | 790 | 70 |
| 6 | 700 | 90 |
| 7 | 600 | 100 |
| 7½ | 560 | 80 |

By the end of the 7½ minutes, the steam pressure had dropped to 18 lbs. per square inch. Introduction of steam was discontinued and the ore cooled to 105° F. in a period of approximately 20 minutes. To prevent development of a vacuum due to steam condensation, hydrogen was bled into the retort during this phase of the cooling. The cooled ore had moisture content of 23.3%.

Substantially pure carbon monoxide gas was then passed through the retort during agitation of the ore for a period of approximately 20 hours. The moisture content of this gas was controlled by passing the same through a humidifier before introducing it into the retort so that the moisture content of the ore in the retort was maintained substantially constant at approximately 23%. The rate of introduction of the gas varied during the run from approximately 0.045 cubic foot per minute per pound of ore at the beginning to approximately 0.016 cubic foot per minute per pound of ore at the latter part of the run. The temperature of the ore during gasification was maintained between 102 and 105° F. for the greater portion of the run, but increased to 122° F. in the latter part thereof.

The carbonyl-rich gas from the retort was passed through three decomposing tubes connected in series and positioned in a furnace. The temperatures of the decomposing tubes were maintained as nearly as possible within the range of 440 and 480° F. but varied during the process such that the temperature of the first tube ranged between 438 and 474° F.; the temperature of the second tube ranged between 452 and 502° F.; and the temperature of the third tube ranged between 476 and 514° F. Most of the nickel deposited in the first tube as a layer of malleable metallic nickel which adhered only superficially and was readily stripped from the inner surface of the tube. The nickel content of the ore was reduced from 1.24% to 0.36% nickel and substantially all of the nickel separated from the ore as nickel carbonyl was recovered as metallic nickel in the decomposer tubes.

The recovered nickel was entirely free of iron or other metals as far as could be determined from ordinary analytical procedure, although the ore contained large amounts of iron and a portion of such iron is ordinarily reduced when the ore is subjected to reducing treatment with producer gas under the conditions of time and temperature given above. Also, metallic iron ordinarily reacts with carbon monoxide to form iron carbonyl under the temperature conditions employed in the gasifying step of the present process. Furthermore, iron carbonyl is decomposed and deposited in admixture with nickel under the temperature conditions employed in the decomposing step. It is apparent that at least some iron is reduced in the reduction step of the present invention and that the moisture of the steam introduced during the reoxidizing of the reduced ore reacts with metallic iron present to reoxidize the iron but does not reoxidize the nickel, that is to say, the iron is selectively oxidized with respect to the nickel. The steaming at relatively high temperature is also believed to clean or scour the surface of the metallic nickel. Also, the presence of moisture during the gasifying step aids in maintaining the iron in oxidized form while leaving the nickel in metallic form. That is to say, the employment of moisture throughout the process tends to keep the iron in oxide form so that it will not react with carbon monoxide to produce iron carbonyl. It should also be pointed out that the yield of nickel is considerably higher when the reduced ore is reoxidized as described herein, before treatment with carbon monoxide, than when the reduced ore is simply cooled and then treated with carbon monoxide. The reoxidation therefore, not only minimizes contamination by iron, but also results in greater yield of nickel.

As another specific example, the process has also been carried out as a continuous operation in equipment of the same general type shown in the drawing. A Cuban ore of the type previously referred to and dried to a moisture content of about 2% was fed to an externally fired retort such as described at a feed rate of approximately 23 pounds per hour. The dimensions of the retort and the ore level carried therein were such that the ore during its passage therethrough was maintained at temperatures in the range 950–1125° F. for a period of approximately 1½ hours. Producer gas of the analysis previously given was passed through the retort concurrent to the ore at a rate of 3.5–4 cu. ft. per minute. Steam at approximately 30 pounds pressure was brought into contact with the reduced ore removed from the reducing retort at a rate of approximately 5.5 pounds of steam per hour. The temperature of the ore at the point of reoxidation varied between 850-875° F., and reoxidation with steam in this temperature range was carried out over a period of 10-15 minutes. The remaining steam not consumed in the reoxidation was passed into the cooler and humidifier and the resulting moisture content of the ore was about 15%. By regulating the circulation of cooling water through the jacket of the cooler and humidifier, the temperature of the ore discharged to the gasifier was maintained at about 125° F. Carbon monoxide gas humidified at about 110° F. was circulated through the gasifier at a rate of 6.5 cu. ft. per minute. The temperature of the gasifier was maintained at 110-120° F. by circulating heated water in the jacket thereof. The length of the gasifier and the ore level carried therein were such that the ore remained therein for a period of approximately 24 hours. The carbon monoxide gas containing nickel carbonyl was passed through a gas filter packed with steel wool and subsequently through a decomposing furnace such as described and maintained at a temperature of 500-550° F. This latter temperature was regulated so as to give complete decomposition of nickel carbonyl. By operating in the prescribed manner, the nickel content of the tailings discharged from the process was about 0.35%. The nickel content of the ore fed to the process varied from 1.26 to 1.30%. The iron content of the nickel produced was 0.06%.

While the employment of steam as the reoxidizing agent is preferred it is possible to employ other mild oxidizing agents such as carbon dioxide or a mixture of hydrogen and steam. A mixture of steam and hydrogen can be employed under substantially the same conditions as steam alone. Carbon dioxide can be introduced into the reoxidizing chamber in the same manner as steam but is preferably employed at a higher temperature, for example, between 950 to 1000° F. and for a substantially longer period of time for example from 15 to 60 minutes. The selective action is not as pronounced as with steam. With steam, nickel is consistently recovered having an iron content below 0.1% even from high iron content ores. With carbon dioxide as the reoxidizing agent the iron content may be somewhat increased, but is low relative to that resulting from carbonyling of the same reduced ore without selective reoxidation. Without selective reoxidation, the iron content will usually be at least 40% and sometimes as much as 70% iron. Also hydrogen chloride may be employed as a mild reoxidizing agent to reduce the amount of iron which is separated in a subsequent carbonyling step.

In any of the modifications of the invention above described, it is preferred to maintain the ores being treated in a closed system out of contact with the atmosphere as free oxygen is deleterious in any of the steps This application constitutes a continuation-in-part of my copending application Serial No. 261,379, filed March 11, 1939.

While I have disclosed the preferred embodiments of my invention, it is to be understood that the details thereof may be varied within the scope of the following claims.

I claim:

1. The process of recovering nickel from ores containing the same, which comprises, converting the nickel of the ore into metallic nickel, treating the ore with carbon monoxide while the ore contains at least 15% of moisture to produce substantially pure nickel carbonyl, and thereafter decomposing said nickel carbonyl to deposit substantially pure nickel.

2. In the process of recovering nickel from admixture with other materials, which includes the steps of forming nickel carbonyl by reaction of carbon monoxide with metallic nickel, removing said nickel carbonyl and decomposing the same, the improvement which comprises, treating the mixture containing said metallic nickel with sufficient moisture to impart at least 15% moisture to said mixture and condition said metallic nickel for said reaction with carbon monoxide.

3. The process of recovering substantially pure nickel from ores containing nickel, which comprises, converting at least a portion of the nickel into metallic form at a relatively high temperature, cooling the ore in the presence of substantial amounts of steam to condition the same for treatment with carbon monoxide to form nickel carbonyl, thereafter contacting the cooled ore with carbon monoxide to form nickel carbonyl, removing nickel carbonyl and decomposing the same to produce substantially pure nickel.

4. The process of recovering nickel from ores containing nickel, which comprises, reducing said ores at a temperature between 950 and 1400° F. so as to reduce substantially all of said nickel, thereafter cooling said ore to a temperature between approximately 95 and 105° F. in the presence of sufficient moisture to produce an ore containing metallic nickel and approximately 15 to 30% moisture, thereafter treating the cooled ore with carbon monoxide in the presence of moisture to form nickel carbonyl, removing said nickel carbonyl and decomposing the same in order to deposit substantially pure nickel.

5. The process of recovering nickel from ores containing nickel and iron, which comprises, reducing said ore to reduce a substantial portion of the nickel and a portion of the iron contained therein, thereafter treating the reduced ore to render any reduced iron inert to reaction with carbon monoxide without rendering the reduced nickel inert to said reaction, thereafter contacting the treated ore with carbon monoxide to form nickel carbonyl substantially free of iron carbonyl, and recovering substantially pure nickel from said nickel carbonyl.

6. The process of recovering nickel from ores containing nickel and iron, which comprises, converting nickel of the ore into metallic nickel and at least a portion of the iron into metallic iron, thereafter rendering said metallic iron inert to reaction with carbon monoxide without rendering said metallic nickel inert to reaction with carbon monoxide, thereafter contacting said ore with carbon monoxide under conditions favoring the production of nickel carbonyl by reaction with said carbon monoxide, separating said nickel carbonyl from said ore, and recovering substantially pure nickel therefrom.

7. The process of recovering nickel from ores containing nickel and iron oxides, which comprises, reducing a substantial portion of said nickel oxide to metallic nickel and at least a portion of said iron oxide to metallic iron, thereafter selectively reoxidizing said metallic iron to iron oxide without substantially reoxidizing said metallic nickel, thereafter treating said ore with carbon monoxide under conditions favoring the formation of nickel carbonyl to form said nickel carbonyl, separating said nickel carbonyl from said ore and recovering substantially pure nickel therefrom.

8. The process of recovering nickel from ores containing nickel and iron, which comprises, converting a major portion of said nickel into metallic nickel and at least a portion of said iron into metallic iron, thereafter selectively oxidizing said metallic iron without oxidizing said metallic nickel, thereafter converting said metallic nickel into nickel carbonyl substantially free of iron carbonyl, separating said nickel carbonyl from said ore and recovering substantially pure nickel therefrom.

9. In the process of recovering nickel from a mixture containing metallic nickel and iron, which includes the steps of forming nickel carbonyl by reaction of carbon monoxide with said metallic nickel, removing said nickel carbonyl and decomposing the same, the improvement which comprises, treating said mixture prior to the reaction with carbon monoxide with sufficient moisture to render substantially all of said iron inert to carbon monoxide without rendering said nickel inert to carbon monoxide, whereby nickel carbonyl substantially free of iron carbonyl can be formed so as to provide for the recovery of substantially pure nickel.

10. The process of recovering nickel from ores containing nickel and iron, which comprises, converting a major portion of said nickel and at least a portion of said iron to metallic form, thereafter treating the resulting ore with sufficient moisture to render the iron inert to reaction with carbon monoxide without rendering said metallic nickel inert to said reaction, thereafter contacting the treated ore with carbon monoxide to form nickel carbonyl substantially free of iron carbonyl, and recovering substantially pure nickel from said nickel carbonyl.

11. The process of recovering nickel from ores containing compounds of nickel and compounds of iron, which comprises, converting the major portion of the nickel compounds into metallic nickel and at least a portion of the iron compounds into metallic iron, thereafter treating the resultant ore with moisture in sufficient amount and at a sufficiently high temperature to selectively oxidize metallic iron without substantially reoxidizing metallic nickel, thereafter converting metallic nickel into nickel carbonyl substantially free of iron carbonyl, separating said nickel carbonyl from said ore, and thereafter recovering substantially pure nickel from said nickel carbonyl.

12. The process of recovering substantially pure nickel from ores containing nickel and iron, which comprises, converting a major portion of the nickel into metallic nickel and at least a portion of the iron into metallic iron at a temperature between 950 and 1150° F., thereafter cooling the ore in the presence of sufficient steam to condition the metallic nickel for treatment with carbon monoxide to form nickel carbonyl while rendering the iron inert to reaction with carbon monoxide, thereafter contacting the ore with carbon monoxide in the presence of moisture to form nickel carbonyl, separating substantially pure nickel carbonyl from said ore, and recovering substantially pure nickel therefrom.

13. The process of recovering nickel from ores containing nickel and iron oxides, which comprises, reducing said ores at a temperature between 950 to 1400° F. to reduce substantially all of said nickel, thereafter cooling said ore to a temperature between approximately 95 and 125° F. in the presence of moisture to produce an ore containing metallic nickel and approximately 15 to 30% moisture, thereafter treating the cooled ore with carbon monoxide to form nickel carbonyl, removing said nickel carbonyl and decomposing the same at a temperature between 380 and 520° F. in order to deposit substantially pure metallic nickel.

14. The process of recovering nickel from ores containing nickel and iron oxides, which comprises, reducing said ores at a temperature between 1000 and 1025° F. so as to reduce substantially all of said nickel, thereafter cooling said ore to a temperature of approximately 105° F. in the presence of moisture to produce an ore containing metallic nickel and approximately 20 to 25% moisture, thereafter treating the cooled ore with carbon monoxide in the presence of moisture to form nickel carbonyl, removing said nickel carbonyl and decomposing the same at a temperature between 380 and 400° F. in order to deposit substantially pure nickel.

15. The process of recovering nickel from ores containing nickel and iron, which comprises, reducing said ore at a temperature between 950 and 1150° F., rapidly cooling said reduced ore in the presence of wet steam to a temperature below approximately 600° F., thereafter cooling said ore to a temperature between 95 and 125° F. to produce an ore containing between 15% and 25% moisture, contacting the cooled ore with carbon monoxide while mantaining the moisture content thereof between 15 and 30% and the temperature thereof between 95 and 125° F. so as to form nickel carbonyl substantially free of iron carbonyl, separating said nickel carbonyl from said ore and decomposing the same at a temperature between 380 and 520° F. to deposit substantially pure nickel.

16. The process of recovering nickel from ores containing nickel and iron, which comprises, reducing said ore with a reducing gas at a temperature between 1000 and 1025° F., cooling the reduced ore in the presence of wet steam to a temperature at least as low as 600° F. in a period of time of approximately seven or eight minutes, thereafter cooling said ore to a temperature of approximately 105° F. under conditions to produce an ore containing between 20 and 25% moisture, contacting the cooled ore with carbon monoxide while mantaining the moisture content thereof between 20 and 25% and the temperature thereof at approximately 105° F. so as to form nickel carbonyl substantially free of iron carbonyl, separating said nickel carbonyl from said ore and decomposing the same at a temperature between 380 and 400° F. in order to deposit substantially pure nickel.

17. A continuous process of recovering nickel from ores containing nickel and iron oxides, which comprises, continuously introducing said ore in finely divided form into a reduction zone and advancing the same therethrough, contacting said ore with a reducing gas in said zone while the ore is at a temperature between 950 and 1150° F. for sufficient time to reduce substantially all of said nickel, continuously withdrawing the reduced ore from said zone and introducing and advancing the same through a cooling and hydrating zone, contacting said reduced ore in said cooling and hydrating zone with steam and cooling said reduced ore to a temperature between 95 and 125° F. to produce an ore containing between 15 and 30% moisture, continuously withdrawing the cooled ore from said cooling and hydrating zone and introducing and advancing the same through a gasifying zone, contacting said ore in said gasifying zone with carbon monoxide while said ore contains between 15 and 30% moisture and is at a temperature between 95 and 125° F. to form nickel carbonyl substantially free of iron carbonyl, continuously withdrawing nickel carbonyl from said gasifying zone and delivering the same to a decomposing zone, subjecting said nickel carbonyl to temperatures between 380 and 520° F. in said decomposing zone, so as to deposit substantially pure nickel therein, continuously withdrawing the spent ore from said gasifying zone and discharging the same to the atmosphere, maintaining the ore during said process out of contact with the atmosphere and sealing said zones from each other.

18. In the process of recovering nickel from a mixture containing metallic nickel and iron, which includes the steps of forming nickel carbonyl by reaction of carbon monoxide with said metallic nickel, removing said nickel carbonyl and decomposing the same, the improvement which comprises, treating said mixture prior to the reaction with carbon monoxide with carbon dioxide to render substantially all of said iron inert to carbon monoxide without rendering said nickel inert to carbon monoxide, whereby nickel carbonyl substantially free of iron carbonyl can be formed so as to provide for the recovery of substantially pure nickel.

19. In the process of recovering nickel from mixtures containing nickel and iron, which includes the steps of forming nickel carbonyl by reaction of carbon monoxide with metallic nickel, removing said nickel carbonyl and decomposing the same, the improvement which comprises, treating the mixture containing said metallic nickel with the carbon monoxide while said mixture contains moisture in liquid form in a quantity sufficient to insure oxidation of iron in said mixture.

20. The process of recovering nickel from ores containing nickel and iron, which comprises, converting the nickel of the ore into metallic nickel, treating the ore with carbon monoxide while the ore contains at least 3 to 5% of moisture to produce substantially pure nickel carbonyl while retarding formation of iron carbonyl, and thereafter decomposing said nickel carbonyl to deposit substantially pure nickel.

21. The process of recovering nickel from ores containing nickel and iron oxides, which comprises, reducing a substantial portion of said nickel oxide to metallic nickel and a portion of said iron oxide to metallic iron with a reducing gas in the presence of substantial amounts of moisture, thereafter selectively reoxidizing said metallic iron without substantially reoxidizing said metallic nickel, thereafter treating said iron ore with carbon monoxide under conditions favoring the formation of nickel carbonyl to form said nickel carbonyl, separating said nickel carbonyl from said ore, and recovering substantially pure nickel therefrom.

22. The process of recovering nickel from ores containing nickel and iron oxides, which comprises, reducing a substantial portion of said nickel oxide to metallic nickel while retarding the reduction of iron oxide to metallic iron, thereafter selectively reoxidizing metallic iron reduced during reduction of said nickel oxide without substantially reoxidizing said metallic nickel, thereafter treating said ore with carbon monoxide under conditions favoring the formation of nickel carbonyl to form said nickel carbonyl, separating said nickel carbonyl from said ore, and recovering substantially pure nickel therefrom.

KENNETH M. SIMPSON.